March 10, 1931.  F. J. BRISLEE  1,795,994
INSULATION OF ELECTRIC WIRES AND CABLES
Filed April 9, 1930

INVENTOR
Francis Joseph Brislee
BY
his ATTORNEYS

Patented Mar. 10, 1931

1,795,994

UNITED STATES PATENT OFFICE

FRANCIS JOSEPH BRISLEE, OF HUYTON, LANCASHIRE, ENGLAND, ASSIGNOR TO BRITISH INSULATED CABLES LIMITED, OF PRESCOT, LANCASHIRE, ENGLAND, A BRITISH COMPANY

INSULATION OF ELECTRIC WIRES AND CABLES

Application filed April 9, 1930, Serial No. 442,969, and in Great Britain February 9, 1929.

Some of the methods hitherto proposed for the utilization of esterified cellulose is the insulation of electric wires and cables have involved the application of this insulation in the form of layers with textile supporting layers and the maintenance of the laminated structure of the insulation thus produced in the finished insulation. The present invention is based on the discovery that by an appropriate treatment the several layers of such an insulation may be made to unite with each other so that a non-laminated structure results.

Insulation having a laminated structure of the kind indicated has been produced by applying esterified cellulose composition combined with a textile support, such as calico strips or cotton tape, wound around the conductor in layers to form the requisite thickness. In such insulation the esterified cellulose composition is subjected to a drying process so as to remove practically all the solvent before the insulation is applied to the conductor. In another form of esterified cellulose insulation in which a laminated structure is also obtained, the textile support is in the form of tubular braid surrounding the conductor and the esterified cellulose composition is applied by drawing the covered conductor through a vessel containing the composition in a solvent, after which the covered conductor is dried by passing it through a heated tube or by other known methods in which a moderate temperature is employed for driving off practically all the solvent. This coating and drying process may be repeated until the required thickness of composition has been deposited on the braid and dried thereon. After this, a second braid is applied and similarly coated with the esterified cellulose composition. This braiding and coating is repeated until the required thickness of insulation has been applied to the conductor. In both these forms, as usually produced, impregnation of the textile support by the esterified cellulose composition is not obtained. The composition is applied under approximately atmospheric pressure to the surface of the support and does not penetrate through it.

In accordance with the present invention, I add to processes of the kind just described, the further step consisting of heating the insulation to such a temperature that the esterified cellulose composition (previously hardened by drying) is softened and becomes sufficiently plastic or fluid for adjacent layers to unite and to penetrate or impregnate the textile supporting materials embedded in or placed around the esterified cellulose layers. After cooling, the resulting product is a solid insulation possessing improved electrical and mechanical qualities as compared with esterified cellulose insulation produced by the known processes described above.

Figure 1:
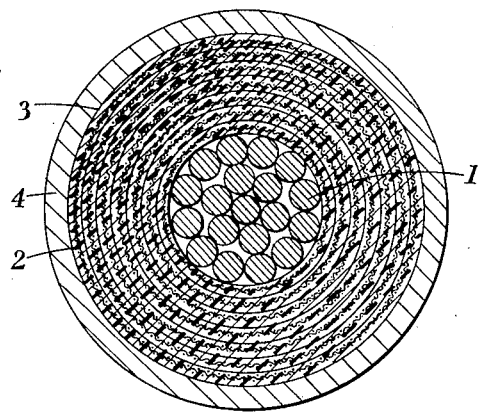
Figure 1 is a view in section of an insulated electric cable before the application of the heat treatment.
Figure 2:
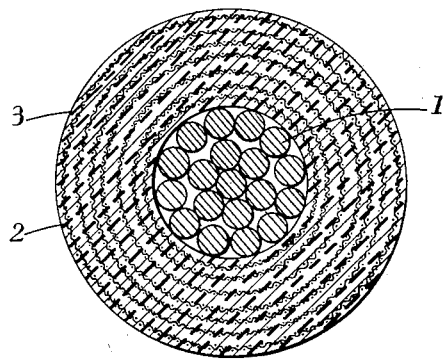
Figure 2 is a view similar to Figure 1 of an insulated electric cable after the application of the heat treatment.

As shown in Figure 1 the conductor 1 is surrounded by layers of textile material 2, each one of which bears on each face a coating of esterified cellulose composition 3. This figure illustrates the condition of the interior of the insulation prior to the application of the heat treatment in accordance with the present invention. It will be noted that there is a definite laminated structure, each layer of esterified cellulose insulation with the enclosed textile support being separate from the adjacent layers. Figure 2 illustrates the condition which exists after the heat treatment. It will be noted that the laminated structure has disappeared, there being no separation between the adjacent layers of esterified cellulose insulation.

The invention is applicable both to cases where the esterified cellulose insulation is applied directly to the bare conductor and to cases where some other insulating material is interposed.

The heat treatment may be given to the insulation after it has been applied to the conductor, or in some cases during its application. The latter method is only used where the removal of solvent has been effected by drying prior to the placing of the insulation on the conductor. The heat treatment consists in raising the temperature of the insulation to the neighborhood of 100° C. and maintaining it therefor a short period, sufficient to enable the softening and penetration and adhesion to take place. It may be necessary in order to complete these effects to raise the temperature somewhat above 100° C. The heat treatment required need last only for a comparatively short time and the heating of the same portion may be repeated at intervals without disadvantageous results. Accordingly it is possible to heat each layer of tape or similar material just as it approaches the conductor or just after it has been applied to the surface so as to soften the coating and cause it to penetrate its support and adhere to the layer underneath.

Where the insulation has been applied in the form of strip or tape by a cable wrapping machine each strip after leaving its coil and immediately before making contact with the cable may be heated by passing through a hot tube or over a hot surface which may be provided by a duct or guide plate which rotates with the other moving parts of the machine and is preferably heated electrically. Alternatively the heating may take place simultaneously with the wrapping of the strip on the cable, a heated surface being pressed against the cable so as to have a kind of ironing action. As the layers are applied in close succession either of these methods of treatment will have the result that several adjacent layers are simultaneously in the soft state and capable of joining together.

Where the heating takes place after the completion of the application of the insulation to the cable; this may be done either as a continuous process by drawing the cable through a heating chamber or it may be done as a separate step by placing the coil of cable in a heating chamber.

For the consolidation of the layers of insulation by heat treatment after application it will probably be advantageous in many cases to enclose the insulation in such a way that it cannot change its shape or dimensions when it softens. For this purpose the cable in the condition shown in Figure 1 can be covered with a lead sheath 4 applied in well-known manner before the heat treatment is effected. After this treatment has been carried out the lead covering may be removed, if it is not required to form part of the completed cable. Instead of a lead sheath, one or more wrappings of strong tape on the outside of the conductor may suffice for producing the desired internal solidity of the insulation. Where the lead sheath is applied it may be provided that the heat contained in the sheath and transmitted by it to the insulation will suffice for the heat treatment of the insulation either completely or in part. In the latter cases the sheathed cable may be drawn through a heater as it leaves the lead press.

Where a layer of esterified cellulose insulation is used, in conjunction with a layer of rubber or other vulcanizable material (for which the esterified cellulose may also provide a protective covering in some cases) the consolidation of the esterified cellulose layer, by heat treatment, may take place simultaneously with the vulcanization of the rubber or other material enclosed within it.

Figure 3:
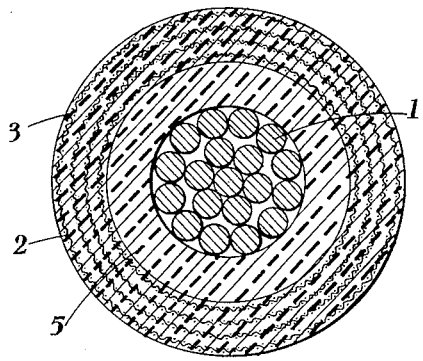
Figure 3 is a view in section of a rubber-covered insulated electric cable after the application of the heat treatment.

In providing a composite insulation of the kind above indicated, we proceed by applying the rubber, or other vulcanizable material, to the wire or cable in any known manner, and then applying the esterified cellulose composition with a textile support or insertion, by wrapping spirally or longitudinally tape or strip material over the outside of the vulcanizable insulation. After which an outer covering, which may be a wrapping or wrappings of strong tape or a lead sheath, is applied to enclose the insulation and maintain its solidity during heating, the wire or cable is then heated in the manner usual for vulcanizing, and thereby the vulcanization and the consolidation are produced simultaneously. After cooling this the outer covering of tape or lead may be removed if desired. A cable of this kind is indicated in Figure 3 where the conductor 1 is shown surrounded by an inner layer of vulcanized rubber 5 and an outer layer of consolidated esterified cellulose insulation 3 with the embedded textile supports 2.

The esterified cellulose composition will contain one or more plasticizers, the action of which is of importance in obtaining the consolidation of the layers of insulation by heat in accordance with the present invention.

The following is an example of a cellulose acetate composition in a solution appropriate for application by coating to a textile support such as cotton tape or braid:—

| | | |
|---|---|---|
| Cellulose acetate | 10 | gms. |
| Acetone | 85 | ccs. |
| Alcohol | 8 | ccs. |
| Benzol | 7 | ccs. |
| Triacetin | 9 | gms. |
| Spirit nigrosine | 0.5 | gms. |

In this the acetone, alcohol and benzol act as solvents and their proportions may be varied somewhat, and the alcohol and benzol may be replaced by other solvents. The spirit nigrosine is a colouring agent and may be omitted or replaced by another colouring agent according to the requirements of the case. The triacetin is the plasticizer and may be replaced by other plasticizers either wholly or in part. Suitable plasticizers are:—dibutyl tartrate, xylenol, cresol. It is important that the cellulose acetate should be absolutely free from acid.

A nitrocellulose composition in a solution appropriate for application to a textile support is as follows:—

| | |
|---|---|
| Nitrocellulose syrup | 26 gms. |
| Butyl acetate | 18.5 ccs. |
| Alcohol | 22.5 ccs. |
| Benzol | 22.5 ccs. |
| Castor oil | 7.7 ccs. |

In this the alcohol and benzol act as solvents, the butyl acetate and the castor oil are plasticizers.

A solution of the kind indicated is applied to the appropriate textile support which may be in the form of strips or may be cut up into strips after coating and drying. It is important that in the course of drying all or nearly all of the solvent part of the mixture should be evaporated so as to avoid a loss in volume of the insulation under the subsequent heat treatment. The thickness of the coating must be so proportioned to the volume and form of the textile support that the coating material can penetrate and fill all the interstices in the support when the heat treatment is applied.

What I claim as my invention and desire to secure by Letters Patent is:—

1. A process for the manufacture of an insulated electric conductor, which comprises applying insulation, embodying an esterified cellulose composition, under approximately atmospheric pressure, in layers round the conductor with textile supports, said insulation being hard and substantially free of solvent, and then heating the insulation to a temperature of approximately 100° C. at which the composition softens and flows so that adjacent layers unite and the composition penetrates and impregnates the associated textile material forming the supports, thereby consolidating the insulation.

2. A process for the manufacture of an insulated electric conductor, which comprises applying a body of vulcanizable insulating material round the conductor, and applying a further body of insulation, consisting of an esterified cellulose composition substantially free of solvent, with textile supports, round the outside of the vulcanizable material in layers, and then heating the insulated conductor to a temperature of at least 100° C. to vulcanize the inner insulation and simultaneously consolidate the outer insulation by causing the esterified cellulose composition to soften and flow so that adjacent layers unite and the composition penetrates and impregnates the associated textile material forming the supports.

3. A process for the manufacture of an insulated electric conductor, which comprises applying a body of vulcanizable insulating material round the conductor and wrapping a further body of insulation, consisting of textile tape having a dry hard coating of esterified cellulose composition, round the first body in a number of layers, then heating the insulated conductor to at least 100° C. to vulcanize the inner insulation and simultaneously consolidate the outer insulation by causing the esterified cellulose composition to soften and flow so that adjacent layers unite and the composition penetrates and impregnates the associated textile material forming the supports.

In testimony whereof I affix my signature.

FRANCIS JOSEPH BRISLEE.